United States Patent [19]

Milo

[11] Patent Number: 4,607,305

[45] Date of Patent: Aug. 19, 1986

[54] MONOLITHIC MULTICHANNEL MULTISTACK MAGNETIC TRANSDUCER ASSEMBLY AND METHOD OF MANUFACTURING THEREOF

[75] Inventor: Richard K. Milo, Poway, Calif.

[73] Assignee: Ampex Corporation, Redwood City, Calif.

[21] Appl. No.: 464,831

[22] Filed: Feb. 8, 1983

[51] Int. Cl.[4] .......................... G11B 5/265; G11B 5/29
[52] U.S. Cl. .................................... 360/121; 360/125; 29/603
[58] Field of Search ............... 360/121, 126, 127, 125; 29/603

[56] References Cited

U.S. PATENT DOCUMENTS 3,839,784 10/1974 Pierce ..................................... 29/603
3,842,494 10/1974 Chiba ............................. 360/121 X

*Primary Examiner*—A. J. Heinz
*Attorney, Agent, or Firm*—Elizabeth E. Strnad; Joel D. Talcott

[57] ABSTRACT

A plurality of magnetic blocks is integrally joined side-by-side with a nonmagnetic material therebetween to provide a monolithic block defining parallel transducing gap planes, each pertaining to one multichannel transducer stack. A plurality of first parallel slots in the monolithic block intersects the gap planes to define a plurality of partitions, each partition forming pairs of magnetic pole pieces defining respective transducing gaps pertaining to respective stacks. The transducing gaps of each partition define interlaced transducing channels of the multichannel assembly. Second parallel slots provided along the gap planes have apexes defining transducing gap depths. The resulting transducing channels have uniform gap azimuth and gap depth while uniform internal stack alignment between all the respective stacks is obtained.

41 Claims, 11 Drawing Figures

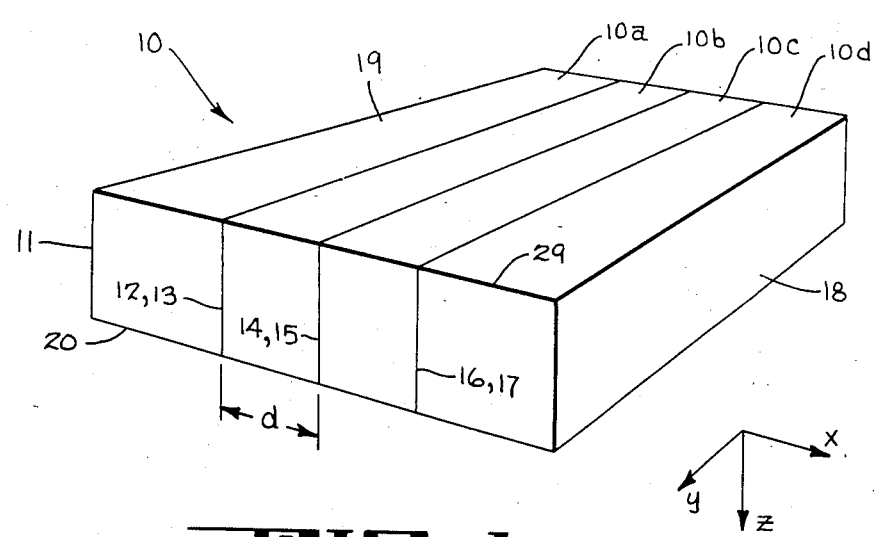
FIG_1
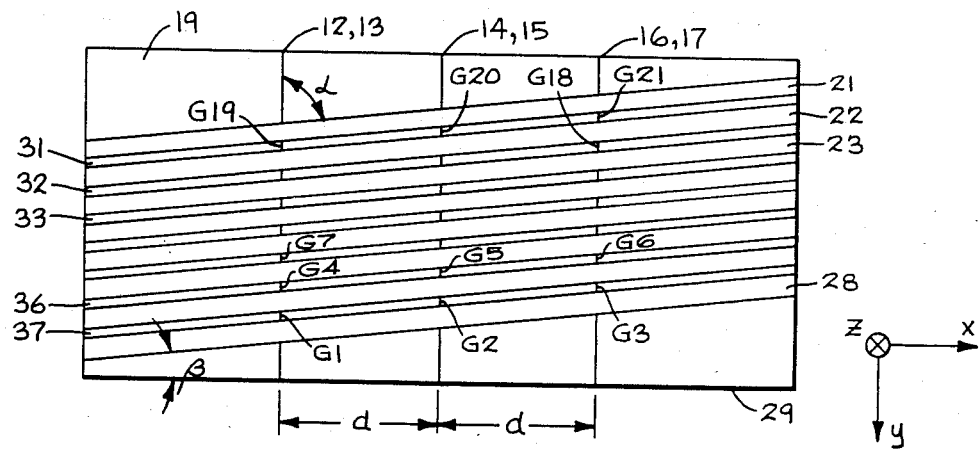
FIG_2

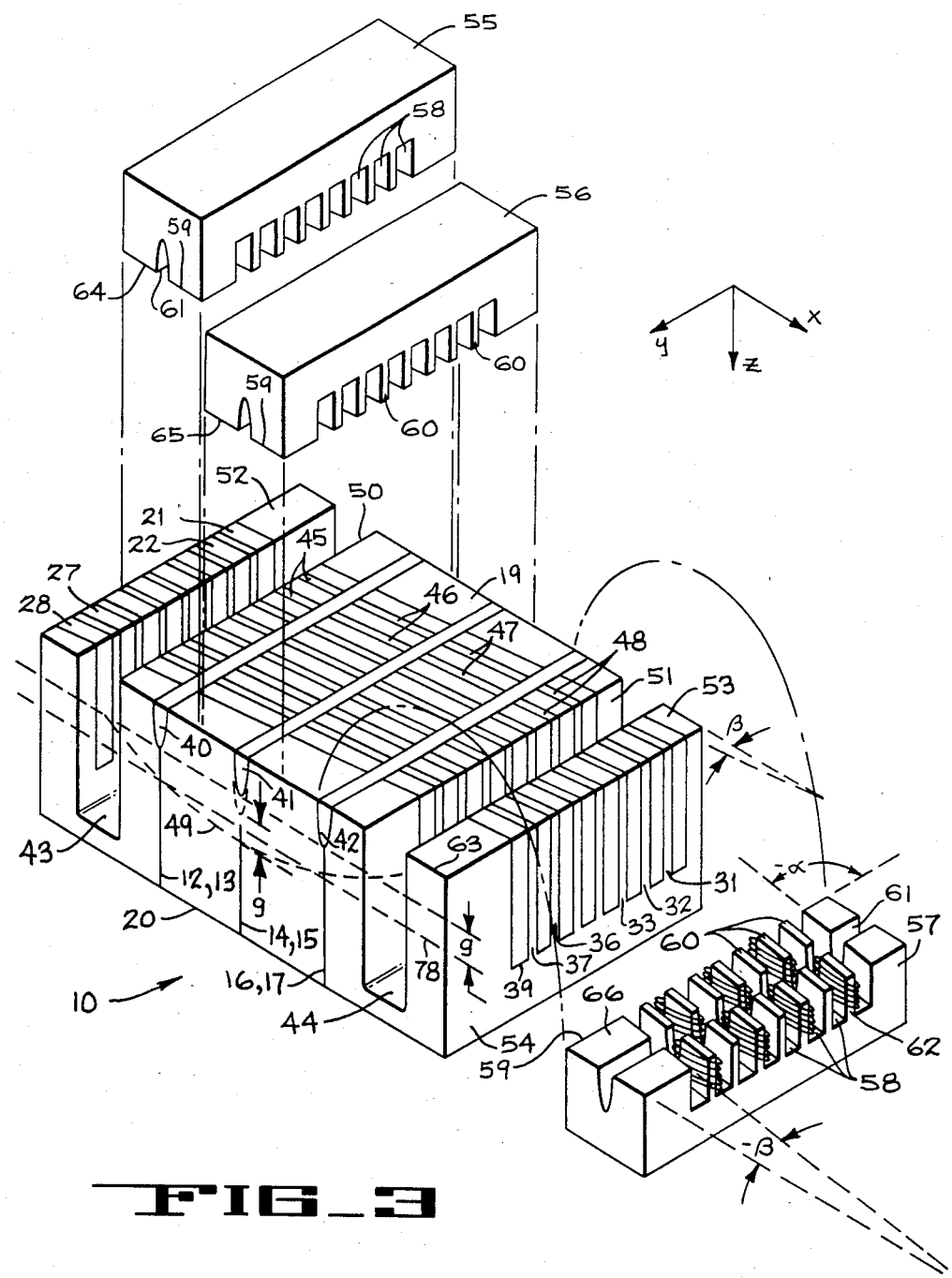
FIG_3

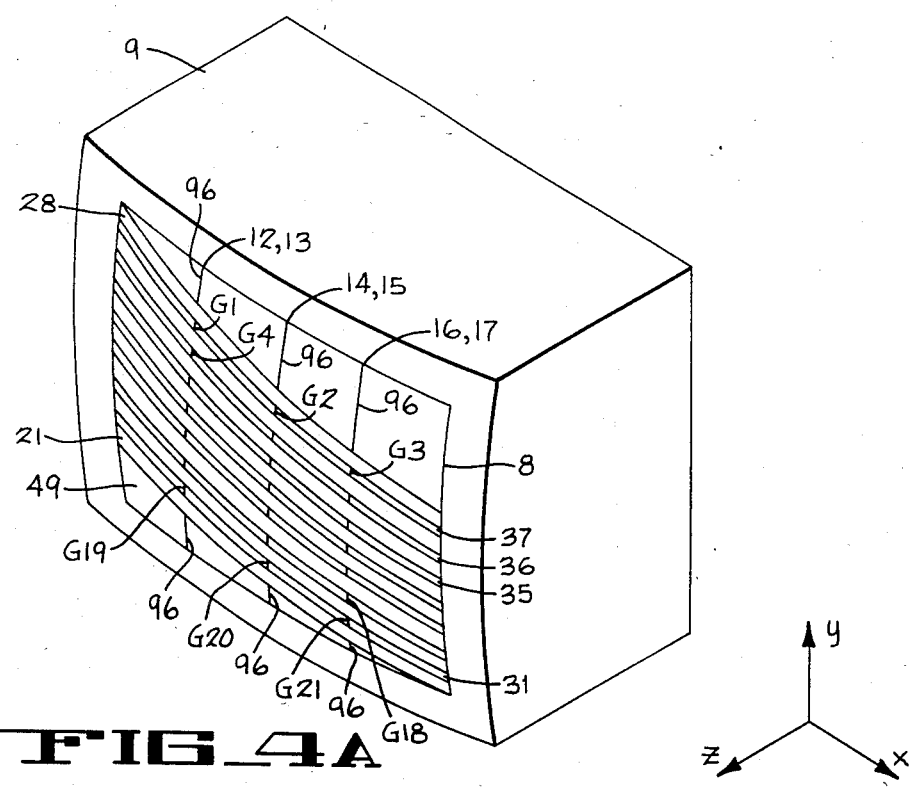
FIG_4A
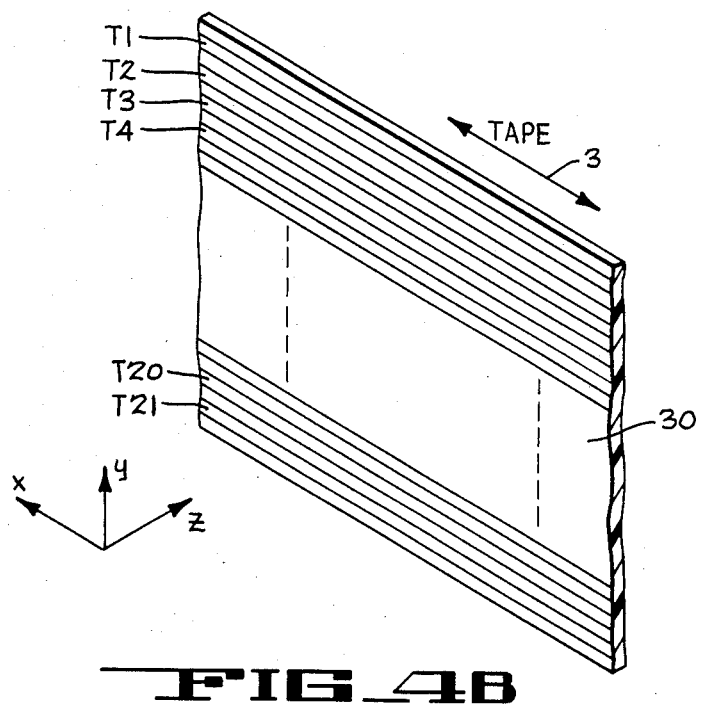
FIG_4B

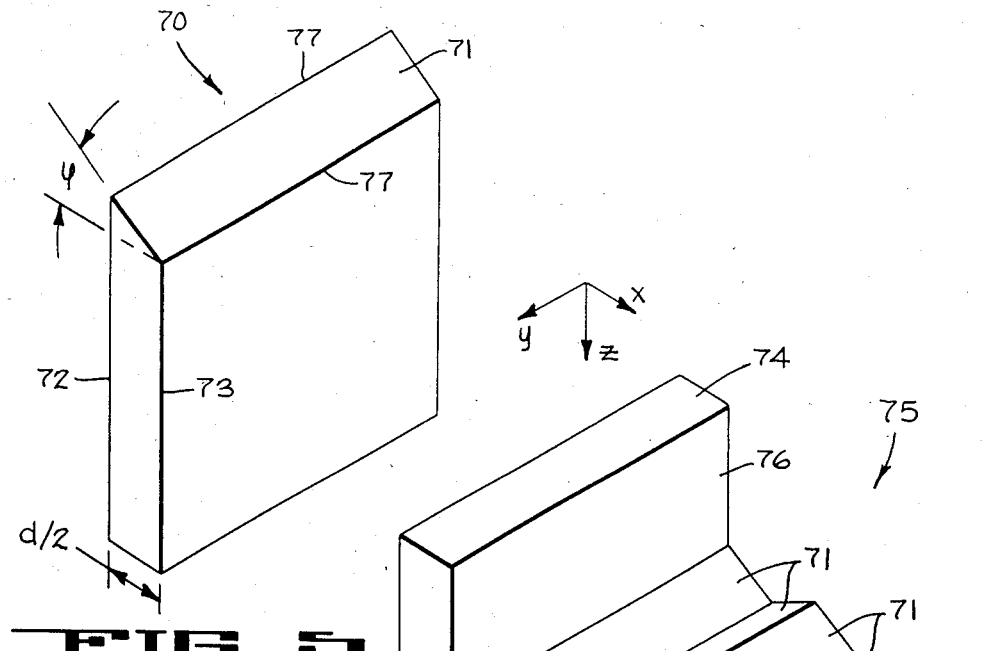
FIG_5
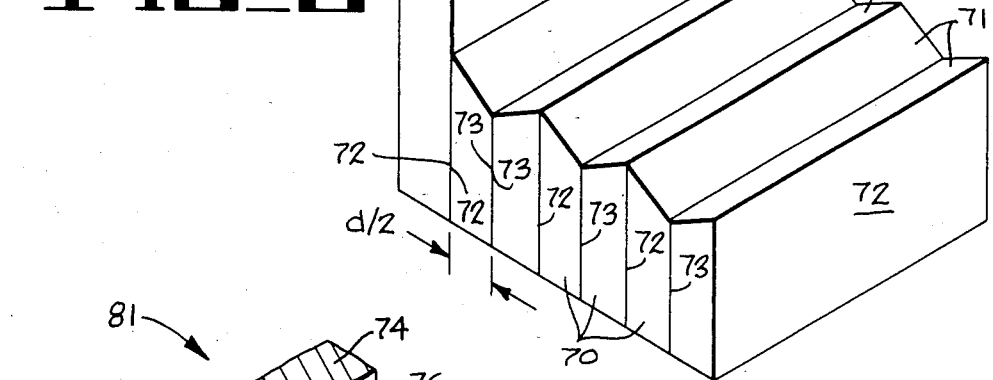
FIG_6
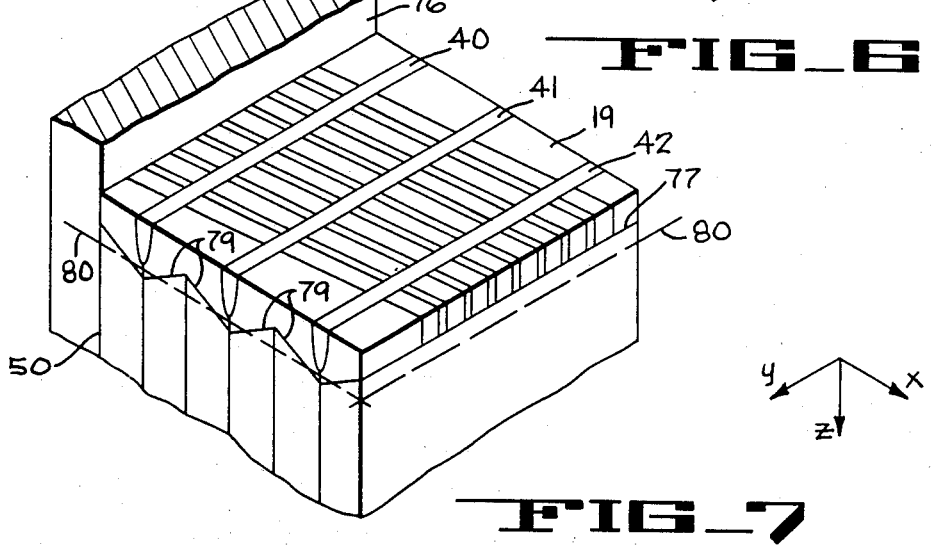
FIG_7

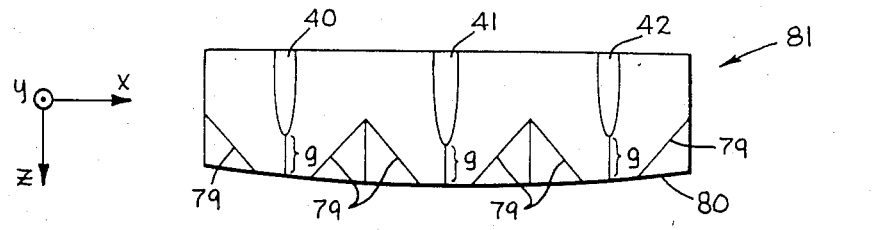
FIG_8A
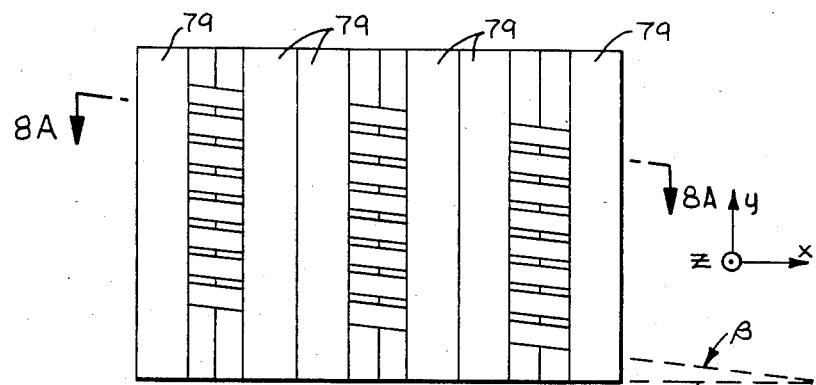
FIG_8B
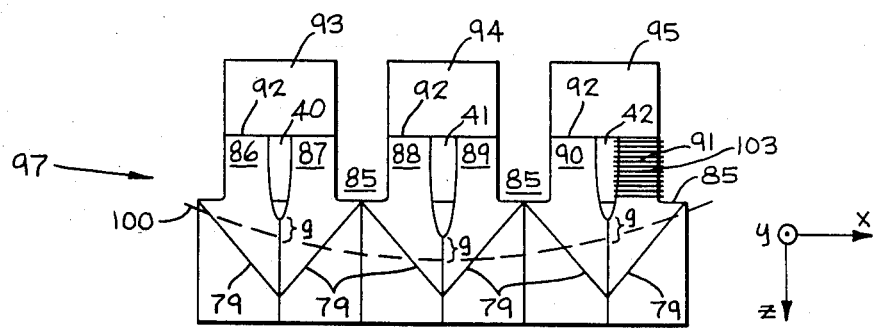
FIG_9

MONOLITHIC MULTICHANNEL MULTISTACK MAGNETIC TRANSDUCER ASSEMBLY AND METHOD OF MANUFACTURING THEREOF

The invention described herein was made in the course of Contract No. 10446-78 awarded by the United States Government.

The invention relates to a multichannel multistack magnetic transducer assembly and a method of manufacturing thereof, having precisely parallel uniformly spaced interlaced transducing channels suitable for high density recording and playback.

Multichannel multistack transducer assemblies are known to be manufactured of individual multichannel stacks, each stack comprising a predetermined number of parallel transducing channels having transducing gaps aligned along a common gap plane. Two or more such multichannel stacks are assembled to obtain interlaced parallel transducing channels of each stack with the channels of the other stack or stacks. The latter arrangement serves to increase the density of the recorded tracks on a magnetic medium by utilizing a number of interlaced transducer stacks while the channel-to-channel spacing within each stack remains relatively large.

However, when utilizing the above indicated prior art technique of making a multistack transducer assembly it is difficult to obtain precisely uniform track-to-track spacing on the recording medium as it is necessary for obtaining high quality, high density magnetic recording and playback. The foregoing disadvantage is due to build-up of mechanical tolerances between individual channels of the interlaced stacks which results in nonuniform gap azimuth, non-uniform gap depth, and nonuniform interlacing between the individual stacks.

Other alignment related problems may also be encountered when utilizing the prior art multistack transducers which further degrade the quality of magnetic recording and playback.

Accordingly, it is an object of this invention to provide a multichannel multistack magnetic transduer structure having precisely parallel transducing channels and uniform channel-to-channel spacing of all the interlaced channels.

It is a further object to provide a multichannel multistack transducer assembly having precisely parallel and uniform gap azimuth alignment on all the recording channels.

It is a further object to provide a multichannel multistack transducer structure having a precisely uniform internal gap apex alignment between all the respective stacks.

It is still another object to provide two or more multichannel transducer stacks having interlaced parallel channels where the usual build-up of channel-to-channel tolerances within each stack as well as between the respective stacks are substantially reduced.

It is a further object of the invention to provide a multichannel multistack transducer structure having the above indicated features and which may be provided with flat, cylindrical, spherical or eliptical contour respectively.

It is another object of this invention to provide a novel method of manufacturing a multichannel multistack magnetic transducer assembly having the above-indicated features.

It is still another object to provide a multichannel multistack transducer structure and manufacturing method having the above-indicated features and adapted for economical production.

These and other objects and advantages of the invention will become apparent from the following description and accompanying drawings.

BRIEF DESCRIPTION OF THE DRAWINGS

FIGS. 1 and 2 show respective method steps utilized in constructing a monolithic multistack multichannel magnetic transducer assembly of the preferred embodiment of the invention;

FIG. 3 shows a partially exploded perspective view of the transducer assembly of the preferred embodiment;

FIG. 4A shows a perspective view of the finished transducer assembly of the preferred embodiment inserted in a nonmagnetic housing;

FIG. 4B shows a recorded track format on a magnetic tape as obtained by the transducer of the preferred embodiment;

FIGS. 5–9 show various method steps utilized for constructing alternative embodiments of the monolithic multistack magnetic transducer assembly of the invention.

DETAILED DESCRIPTION

A monolithic multistack multichannel magnetic transducer assembly in accordance with the preferred embodiment of the invention and preferred method steps of making the transducer will be now described with reference to FIGS. 1 to 4B of the attached drawings.

To facilitate the following description a three dimensional orthogonal axis orientation X, Y, Z is shown and maintained consistent throughout the various drawing Figures. To facilitiate comparison like elements are designated by like reference numerals throughout the drawings.

FIG. 1 shows a monolithic block 10 having a selected number of individual blocks 10a to 10d of magnetic material joined in a side-by-side relationship with each other. As an example, in the preferred embodiment four such blocks are utilized. Preferably, blocks 10a to 10d are sliced from a block of magnetic material, for example ferrite, by well known techinques, for example sawcutting. The respective parallel surfaces 13 to 16 of the intermediate blocks 10b and 10c are cut and lapped in a well known manner to a precise dimension d which corresponds to a desired transducing gap spacing between adjacent stacks. Corresponding opposite parallel surfaces 11 to 18 of blocks 10a to 10d are smoothly lapped and intermediate surfaces 12 to 17 are optically polished by well known methods to obtain transducing gap planes. Surfaces 12 to 17 will also serve as reference surfaces to determine an angle $\alpha$ at which the transducing channel will extend with respect to the gap planes, as it will follow from further description. The thusly prepared parallel surfaces 12 to 17 are provided with a layer of nonmagnetic bonding mnterial suitable for forming transducing gaps. For example the latter surfaces may be vacuum sputtered with glass by well known techniques to obtain a thickness of gap material required for a desired transducing gap length. The blocks 10a to 10d are then asssembled with the confronting surfaces 12, 13; 14, 15; and 16, 17 in an abutting relationship as shown in FIG. 1 and then bonded together in a well known manner. The thusly formed confronting parallel surfaces, 12, 13; 14, 15; and 16, 17 will further be referred to as gap planes and the resulting intergally joined block 10 as the monolithic block, multistack structure or front bar, respectively.

In accordance with a further method step opposite surfaces 19 and 20 extending over all the joined blocks 10a to 10d are lapped and polished flat and in perpendicular to the respective gap planes to obtain a common upper planar surface 19 on the monolithic block 10 and to obtain a lower reference surface 20 parallel with surface 19. The thusly prepared block 10 is then held in a suitable fixture (not shown) and a plurality of longitudinal parallel grooves or slots 21 to 28 are partially cut into block 10, inwardly of surface 19 for example by saw cutting or other well known techniques. In accordance with the teachings of the present invention and as shown by the way of example in FIG. 2, parallel slots 21 to 28 are cut at a selected angle $\alpha$ into block 10 while utilizing the parallel gap planes 12, 13 to 16, 17 as a reference. The direction of edge 29 of the preferred embodiment corresponds to the direction of a relative transducer-to-recording medium movement as it will follow from further description. It is noted that in the preferred embodiment these slots 21 to 28 extend at a non-orthogonal angle $\alpha$ with respect to the transducing gap planes as shown in FIG. 2. The depth of grooves 21 to 28 in the direction of axis Z is made not to exceed the thickness of block 10 in that direction as it is shown at 39 in FIG. 3. Consequently, the thusly obtained parallel partitions 31 to 37 separated by the slots 21 to 28 do not become physically separated from the block 10 and remain held together by a common basis 54 until these partitions become separated during the contouring operation.

Both the distance d between the adjacent gap planes 12, 13; 14, 15; and 16, 17 and the angle $\alpha$ respectively shown in FIG. 2, are selected to obtain a desired recording track format on an associated magnetic medium by the resulting interlaced transducing channels which track format is shown as an example in FIG. 4B.

As it is seen from FIG. 2 each partition 31 to 37 of the resulting transducer structure 10 intersects the respective gap planes thus forming three transducing gaps, each gap pertaining to one transducing channel in a side-by-side relationship. Each of these gaps is formed by the respective magnetic pole pairs of each such partition. For example, partiton 37 contains gaps G1 to G3, partition 36 gaps G4 to G6, etc. Thus in the preferred embodiment seven partitions 31 to 37 are obtained together containing 21 transducing gaps G1 to G21 respectively. As it will follow from further description these gaps G1 to G21 correspond to 21 interlaced recording tracks T1 to T21 on tape 30 as shown in FIG. 4B. At the same time, transducing gaps G1, G4, G7, etc. which are precisely aligned along gap plane 12, 13 pertain to a first multichannel stack, gaps G2, G5, etc. precisely aligned along plane 14, 15 pertain to a second multichannel stack and gaps G3, G6, G9, etc. precisely aligned along plane 16, 17 pertain to a third stack.

After cutting slots 21 to 28 these are preferably filled with a suitable nonmagnetic material, for example a selected type of glass such as Corning Glass No. 7570 or 9025, respectively, sold by Corning Glass Works. Preferably the selected nonmagnetic material has a wear rate and coefficient of thermal expansion similar to that of the magnetic material of block 10. The selected glass is flown in at elevated temperature and thereafter hardened in a manner well known in the art. It is noted that depending on the type of glass and thus the particular temperature applied, it may be necessary during the filling process to clamp the respective blocks 10a to 10d together in a known manner to avoid possible damage to the previously formed transducing gaps G1 to G21. The thusly obtained nonmagnetic filler serves as a spacer between respective transducing channel forming partitions of the multistack monolithic transducer block 10 while it separates from each other adjacent channels of each stack. At the same time the latter filler strengthens the transducer structure. After the glass filling process is completed the upper planar surface 19 is relapped parallel to reference surface 20.

In accordance with a further preferred method step and with reference to FIG. 3 the thusly prepared monolithic block 10 is held in a suitable fixture (not shown) and second parallel grooves or slots 40 to 42, further referred to as apex grooves, are cut therein inwardly of plane 19 along the gap planes 12, 13; 14, 15; 16, 17 respectively. These apex grooves serve to separate respectively confronting pole pieces 45, 46; 46, 47; and 47, 48 of the respective transducing channels from each other at a rear portion of the transducing gap. The depth of apex grooves 40 to 42 in the direction of Z axis is selected such that the distance g from the bottom of each apex groove to a final head contour such as shown at 49 or 78, respectively, corresponds to a desired transducing gap depth of each multichannel transducer stack. In the example of FIG. 3 when the flat contour line 78 is provided the dimension g is the same for all the multichannel transducer stacks. Alternatively for the cylindrical contour 49 the depth of the middle groove 41 will be greater than the depths of outer grooves 40, 42 to obtain a uniform gap depth g of all the head stacks after contouring. Alternatively, for a spherical or eliptical contour, the apex grooves may be formed by plunge cutting along the Z axis with a blade whose radius matches that of the desired contour along the Y axis while adjusting the depth of cut from gap plane to gap plane to compensate for the curvature along the X-axis of the final contour.

When cutting the second grooves 40 to 42, additional parallel grooves 43 and 44 may also be cut to define side walls 50, 51 of the multistack structure 10 precisely in parallel with the gap planes 12, 13 to 16, 17. Grooves 40 to 44 may be cut by well known techniques, for example by saw cutting operation. The lateral portions or bars 52, 53 obtained by the latter cutting operation will be removed at the contouring step.

The respective second grooves 40 to 42 are thereafter preferably filled with a nonmagnetic filling material to further strengthen the resulting monolithic multistack structure 10. The latter filling material, for example glass, is preferably of the type having a lower melting temperature than the material filling grooves 21 to 28. The upper surface 19 is thereafter lapped and polished flat parallel to surface 20.

If required, prior to the above-described step of filling the slots 21 to 28 magnetic and/or electric shields (not shown) may be inserted into these grooves in a manner well known in the art to improve electro-magnetic shielding between the respective adjacent transducing channels. The latter shields, for example of mumetal-copper-mumetal laminations may be inserted in slots 21 to 28 and held in a suitable fixture (not shown) out of contact with the individual partitions 31 to 37. Thereafter the step of filling grooves 21 to 28 with a suitable non-magnetic material follows as it has been described previously.

Depending on the physical and mechanical properties of the magnetic material utilized in constructing the monolithic block 10 and the particular recording/reproducing application for which the resulting transducer is intended it may be possible to construct a transducer in accordance with the invention in which the grooves 21 to 28 are not filled with nonmagnetic material.

As a further alternative to the above-described preferred embodiment, it may be possible to delete the step of cutting second grooves 40 to 42 into block 10. In the latter case the transducing gap depth of the respective transducing channels would be defined by the upper planar surface 19 which then would be assembled with a back core structure such as 55 to 57 in FIG. 3. The latter alternative embodiment may be useful when the previously mentioned planar head contour 78 is utilized and thus there is no need to compensate for different gap depths for the respective head stacks as mentioned earlier.

For example, the preferred embodiment of the invention may be utilized to provide a recording format having a recorded track width of 1 mil on an associated recording medium, such as a magnetic tape 30 shown in FIG. 4B. In the preferred embodiment tape 30 moves relatively to the multistack transducer of the invention in the direction of arrow 3, that is parallel to axis X. For example, a 0.5 mil guard band may be desired between adjacent recorded tracks, that is a 1.5 mil center-to-center track spacing, which spacing is further referred to as format track pitch. The recorded tracks T1 to T21 on tape 30 in FIG. 4B are shown to extend in a longitudinal direction, parallel with axis X while the parallel transducing channels provided by partitions 31 to 37 of the multistack structure extend with respect to axis X at angle $\beta$ as shown in FIG. 3. In the example of the preferred embodiment the distance between respective adjacent parallel gap planes 12, 13; 14, 15; and 16, 17 has been selected d=20 mil as mentioned previously and angle $\beta$ has been selected 4 degrees and 17 minutes. The selected number of multichannel transducer stacks in this example equals three, and therefore the distance between respective centers of adjacent partitions or channels 31 to 37 in the direction of Y axis is $3 \times 1.5$ mil=4.5 mil, to which distance it will be referred to as format stack pitch or format partition pitch. It is noted that angle $\beta$ as well as other recording channel and track related dimensions are substantially enlarged in the Figures for better clarity.

It follows from well known geometric relations with respect to the selected angle $\beta$ between the direction of the parallel transducing channels provided by partitions 31 to 37 of structure 10 and axis X extending in the longitudinal direction of recording tracks on the associated magnetic medium 30 that the width of these partitions has to be smaller than the desired recording track width. Similarly the partition pitch perpendicular to the slots 21 to 28 has to be made proportionally smaller than the desired format track pitch. It will be understood however that for sufficiently small angles, preferably under 10 degrees, the recording track width does not differ appreciably from the transducing channel partition width.

With respect to the foregoing description it will be understood that instead of cutting slots 21 to 28 at a non-orthogonal angle $\alpha$ with respect to transducing gap planes as shown in FIG. 2 to obtain partitions 31 to 37, forming interlaced tranducing channels with respect to an associated recording medium as shown at 30 in FIG. 4B, alternatively the respective slots may be cut at 90° to the gap planes. In the latter embodiment the desired interlaced channels are obtained by providing a direction of relative transducer-to-medium movement extending at a desired non parallel angle to the transducing channels formed by partitions 31 to 37. For example, the above-described recording format could be obtained by this alternative embodiment when moving the tape, such as 30 of FIG. 4B in a longitudinal direction extending at the above-indicated angle $\beta$ with respect to partitions 31 to 37, that is, at angle $\beta+90°$ with respect to the gap planes 12 to 17.

It will be understood from the foregoing description that the multistack transducer structure of the invention is not limited to three head stacks. Thus two, four, five or more head stacks may be arranged in a side-by-side relationship in a similar manner to form a monolithic block having precisely parallel transducing gap planes provided within the same block. For example, to obtain the same recording format as above described, if two parallel stacks are utilized, a partition stack pitch of 3 mils would be selected or alternatively a partition stack pitch of 6 mils may be selected for four parallel stacks, etc.

It is an important feature of the present invention that regardless of the number of stacks or parallel gap planes utilized, all the stacks are integrally joined in a monolithic block and all the first and second parallel slots 21 to 28 and 40 to 42 of all the stacks are cut into that block as a unit. The result is a unitary monolithic multistack transducer structure having precisely uniform gap azimuth of all the transducing channels within the entire structure. Consequently, a desired azimuth adjustment of all the stacks may be provided simultaneously by rotating the entire multistack assembly in space, with respect to Z-axis, to produce the desired recording format on the magnetic medium. Thus providing individual azimuth adjustment as necessary for prior art multichannel transducer stacks is hereby eliminated and azimuth error due to build-up of mechanical tolerances between interlaced stacks is substantially reduced. Furthermore, by such rotation of the monolithic structure a correct guard band between recorded tracks is automatically established.

It is a further significant advantage of the multistack transducer structure and manufacturing method of the present invention that by forming the apex slots 40 to 42 in the monolithic block 10 as a unit there is no internal misalignment between the respective stacks since a build up of tolerances between the various stacks is automatically eliminated. Because all apexes provided by each second groove 40, 41 or 42, respectively, lie on a common line within each stack and all apexes of all these second grooves lie on precisely parallel lines, a uniform internal alignment between the respective stacks also referred to as uniform internal stack tilt is automatically obtained.

Moreover compensation for gap depth variation between stacks is facilitated when utilizing planar, cylindrical, spherical or eliptical head contours by adjusting the gap depth of each stack as described earlier to obtain uniform gap depths of all the stacks after the final contour is provided and thereby obtaining a uniform transducer efficiency on all the channels.

The monolithic multistack structure 10 which results from the above described method steps is assembled with a magnetic back core structure to complete the respective transducing circuits as it will be described below with further reference to FIG. 3. In the preferred embodiment three similar separate back core structures 55 to 57 carrying transducing windings 62 are made and each is assembled with one stack of the multistack structure 10, as shown in FIG. 3. Consequently, back core structure 55 confronts a portion of multistack structure 10 including pairs of pole pieces 45, 46 defining transducing gaps aligned along gap plane 12, 13. Similarly, back core structure 56 confronts another portion of structure 10 which includes pole pieces 46, 47 defining transducing gaps aligned along gap plane 14, 15 while structure 57 confronts pole pieces 47, 48 defining gaps aligned along gap plane 16, 17.

Each structure 55 to 57 is made of a block of magnetic material, preferably ferrite, for example of the type such as utilized for block 10. Each block 55 to 57 is lapped and polished at planes 64 to 66 to obtain a desired surface flatness. A longitudinal slot 61 and parallel slots 58 provided in all the blocks 55 to 57 may be cut simultaneously, for example by known saw cutting techinques to obtain uniformity. Slots 58 extend at angle-$\alpha$ with respect to the longitudinal edge 59 of blocks 55 to 57, the latter angle having the same measure but opposite sign with respect to the angle of previously described slots 21 to 28 of block 10. The angle-$\alpha$ and the width and spacing of the slots 58 in the blocks 55 to 57 are respectively provided to match the above-described slots 21 to 28 in block 10 when assembled therewith as shown in FIG. 3. It will be understood however that the mechanical tolerances of the thusly obtained back core channels 60 defined by the latter slots are substantially less critical than the tolerances of the corresponding multistack structure 10. Block 57 in FIG. 3 is shown as being turned by 180 degrees for better representation of its structure.

FIG. 4A shows a suitable nonmagnetic housing 9 which is provided in a manner well known in the art and into which a multistack transducer assembly corresponding to that previously described with reference to FIG. 3 is inserted in a well known manner. The front portion, that is the transducer-to-medium surface of the transducer assembly inserted in a window 8 of housing 9 corresponds to that shown in FIG. 2. However while FIG. 2 shows the multistack structure 10 from the side of upper surface 19, the structure in FIG. 4A is shown from the opposite, contoured lower surface 49. Consequently the parallel transducing channels in FIG. 4A appear to be slanted in opposite direction with respect to axis X when comparing to FIG. 2.

In applications where crosstalk picked up by relatively wide portions 96 of transducing gap planes in the magnetic block 10 of FIG. 4A may exceed a desired minimum, the crosstalk, may be reduced by providing outer grooves 21 and 28 to have an extended width (not shown) during the above-described step of cutting the first parallel grooves and by subsequently filling the extended grooves with glass during the above-described glass filling step.

As it is seen in the example of FIG. 4A the transducer front surface 49 is made symmetrical with respect to both X and Y axis, respectively. Consequently, after being used for a selected time for magnetic recording and/or reproduction in the above-described position the multistack assembly may be rotated about the Z axis by 180 degrees for further use to obtain a more uniform head wear. It is understood that the leading and trailing edge portions of the transducer will be thereby mutually exchanged while maintaining the same recording format. Alternatively, instead of inserting the multistack structure transducer of the invention into a supporting housing such as shown at 9 in FIG. 4A, the transducer can be utilized as self-supporting in a well known manner.

In the preferred embodiment of the invention as described with reference to FIGS. 1 to 4A undesirable undulations in the low frequency response, generally known as "head bumps" are expected to be reduced by the continuous head shoulder configuration provided between the subsequent interlaced channels of adjacent stacks. For example, as seen from FIG. 3, pole pieces 46 are continuous between respective head stacks having gap planes 12, 13 and 14, 15 and similarly pole pieces 47 are continuous between respective head stacks having gap planes 14, 15 and 16, 17. However, in some applications where it may be desired to reduce crosstalk between the adjacent laterally spaced head stacks they may be separated from each other by providing "head bump" chamfers as it will be described below with reference to the alternative embodiments of FIGS. 5 to 10.

FIG. 5 shows a perspective view of a rectangular block 70 of nonmagnetic material, preferably a hard material such as alumina or similar ceramic material having similar mechanical properties such as wear rate, etc. to those of the magnetic material of block 10. Block 70 is provided with a chamfered top surface 71, for example machined, to obtain a chamfer angle $\alpha$ with respect to parallel surfaces 72, 73. The width of block 71 in the direction of X axis is equal to d/2, where d is the previously described distance between adjacent transducing gap planes within block 10 shown in FIG. 2 and it has been selected d=20 mils in the example of the preferred embodiment. The respective surfaces of block 70 are lapped and polished to obtain desired surface flatness while opposite lateral surfaces 72, 73 are lapped precisely parallel to define a thickness d/2=10 mil. A number of corresponding blocks 70 equal to twice the number of head stacks is provided. Blocks 70 are attached to each other alternatively at lateral surfaces 72 and 73, respectively, to form a nonmagnetic composite block 75 providing alternatively oriented chamfers at upper surfaces 71 as shown in FIG. 6. To facilitate the following method steps, a reference block 74 of the same material as blocks 70 and having a precisely lapped and polished reference surface 76 may be attached to blocks 70. The blocks 70 and 74 are attached to each other preferably by glass bonding utilizing well known techniques. The respective lateral edges 77 of blocks 70 are preferably sharp to facilitate the following method steps and the dimension of these blocks in the direction of the Y axis is relatively long for example four times longer with respect to the length of the multistack structure 10 in that direction.

In accordance with the preferred method steps for making the presently described alternative embodiment, the lateral bars 52, 53 shown in FIG. 3 are removed, for example by grinding, prior to the contouring operation. The structure 10 is then lapped at its lower planar surface 20 to obtain a surface 78 parallel therewith as shown by interrupted line in FIG. 3. The thusly obtained surface 78 is then placed in contact with the above-described chamfered surfaces 71 of nonmagnetic block 75 shown in FIG. 6. A suitable abrasive material, for example a well known diamond lapping compound is placed between the respective surfaces 71 and 78. The latter surfaces are then moved back and forth relative to each other in the direction of axis Y near one end of the chamfered surface 71 while side wall 50 or 51 of block 10 is supported by reference surface 76 of block 75. The latter method step is performed until a lower planar surface on block 10 is shaped such that "head bump" chamfers 79 are obtained thereon corresponding to and engaging precisely surfaces 71 and when a desired depth of these chamfers 79 in the direction of axis Z is obtained with respect to a desired final head contour 80 as it is shown by interrupted line in FIG. 7. The operation is then repeated with a finer grade abrasive compound on the unused portion of surface 71 to obtain a perfect match between the confronting surfaces.

The abrasive material is thereafter cleaned from the chamfered surfaces 71, 79 and the latter surfaces are firmly joined together, for example bonded by epoxy in a well known manner to obtain a composite structure as shown in FIG. 7. The reference block portion 74 is thereafter removed for example by grinding. The upper surface 19 of the thusly obtained composite front core structure 81 of FIG. 7 is then lapped and polished to obtain desired surface flatness and a suitable back core structure is joined thereto in a manner similar to that previously described with respect to back core structures 55 to 57 shown in FIG. 3.

After thusly joining the resulting front core structure 81 of FIG. 7 to a back core structure and inserting the resulting assembly into the non-magnetic housing such as 9 in FIG. 4A a desired head contour 80 is provided utilizing well known contouring techniques.

FIG. 8B shows a front elevation view of a resulting multistack structure corresponding to the above-described alternative embodiment. FIG. 8A represents a section view taken along lines A—A of FIG. 8B with the back core structure deleted. It is seen from the latter Figures that by the above-described alternative method a multistack monolithic head structure is obtained in which the respective transducing channels are interlaced similarly as in the preferred embodiment of FIG. 3. However in the alternative embodiment alternating chamfers 79 between laterally spaced adjacent transducing channels are provided to separate the adjacent head stacks from each other while providing "head bump" reduction in the thusly obtained non-continous pole pieces of adjacent stacks.

FIG. 9 is a section view similar to that of FIG. 8A however showing an alternative back core structure as it will be described below. The embodiment of FIG. 9 is obtained by cutting additional parallel grooves 85 into the previously described monolithic block 10 of FIG. 3, in parallel with the apex grooves 40 to 42 and interspaced therewith. Grooves 85 have a depth in the direction of axis Z smaller than grooves 40 to 42 and they serve to separate from each other the respective pole pieces 87 and 88; 89 and 90 pertaining to adjacent transducing channels. Further slots are cut in the glass filled second slots 40, 41, and 42 and in the glass filled first slots 21 to 28 to the same depth as slots 85. As a result, leg portions 86 to 91 on the respective pole pieces are formed, and transducing windings 103 are placed thereon as schematically shown on leg 91 in FIG. 9. The upper coplanar surfaces 92 of the thusly obtained monolithic front core stacks are then polished flat by well know methods and respective common back core bars 93 to 95 of magnetic material are joined thereto such as by epoxy bonding, to complete the magnetic circuits of the respective transducing channels. Back core bars 93 to 95 are made for example of the same or similar magnetic material as the pole pieces 86 to 91. Each back bar is common to one head stack, respectively. The resulting multistack structure 97 may be inserted into a nonmagnetic housing such as shown at 9 in FIG. 4A. Thereafter the stack is contoured to obtain a desired contour as for example shown by interrupted line 100 in FIG. 9.

It will be understood from the foregoing description that if a cylindrically shaped contour is desired, as shown for example at 80 or 100 in FIGS. 8A or 9, respectively, it is desirable prior to the glass filling step, to cut the apex groove 41 of the middle stack deeper than the respective apex grooves 40, 42 of the two outer stacks to compensate for the curvature while a uniform gap depth g and inner stack tilt of all the stacks is obtained as shown in FIGS. 8A and 9, respectively.

It is seen from the foregoing description that the chamfered nonmagnetic blocks 70 and the front core stacks of the embodiments of FIGS. 7 to 9 together form an integral monolithic structure in accordance with the teachings of the present invention. To add strength and to assure precisely uniform alignment of the front and back core portions of all the channels of the resulting multistack structure, the back core stacks 55 to 57 of FIG. 3 or stacks 93 to 95 of FIG. 9 may be tied together at their respective rear portions by utilizing a tie bar (not shown) in a well known manner. Alternatively, the respective back core stacks may have a common base for added strength.

As an alternative to the above-described embodiments of FIGS. 5 to 9 it is possible to form the chamfered surfaces 79 on the glass filled monolithic block 10 by well known methods, such as by machining and to fill subsequently the chamfered surfaces by a suitable nonmagnetic material, for example glass. The thusly obtained transducer may be contoured by well known techniques to expose a portion of the magnetic poles while providing a desired transducer-to-recording medium surface and to obtain desired transducing gap depths.

While the invention has been particularly shown and described with reference to embodiments thereof, it will be appreciated that various alternatives and modifications may be made which will fall within the scope of the appended claims.

What is claimed is:

1. A multichannel multistack magnetic transducer assembly having interlaced transducing channels of the respective stacks with respect to an associated recording medium relatively moving thereto, comprising:

a monolithic block having at least three blocks of magnetic material integrally joined together at optically flat corresponding opposite parallel planar surfaces with a layer of nonmagnetic transducing gap forming material therebetween, said joined surfaces forming respective parallel transducing gap planes, each gap plane pertaining to one stack of the multichannel multistack assembly, said medium relatively moving with respect to said transducing gap planes in a first direction;

a plurality of parallel transducing channel forming partitions separated from each other by first elongated parallel slots extending with their elongated dimensions across said transducing gap planes in a second direction, different from said first direction; and a magnetic back core assembly with transducing windings provided thereon joined with said monolithic block in mated secured engagement to complete a plurality of magnetic transducing circuits provided by said transducing channel forming partitions of said multichannel multistack transducer assembly.

2. The transducer assembly of claim 1 further comprising a common planar surface extending over all said integrally joined blocks and opposite a transducer-to-recording medium surface and wherein said first parallel slots extend into said monolithic block in perpendicular of said common planar surface.

3. The transducer assembly of claim 2 wherein said magnetic back core assembly has a planar surface confronting said common planar surface of said monolithic block, said respective surfaces being joined in mated secured engagement.

4. The transducer assembly of claim 2 further comprising second parallel slots extending partially into said monolithic block each along one said transducing gap plane inwardly of said common planar surface and substantially in perpendicular thereto, each second slot having an apex defining respective transducing gap depths of one said stack of the multistack transducer assembly.

5. The transducer assembly of claim 1 wherein said first slots are filled with a nonmagnetic material.

6. The transducer assembly of claim 5 wherein said second slots are filled with a nonmagnetic material.

7. The transducer assembly of claim 5 wherein said nonmagnetic material has a coefficient of thermal expansion similar to that of said magnetic material of said monolithic block, respectively.

8. The transducer assembly of claim 1 further comprising:
second parallel slots extending partially into said monolithic block each along one said transducing gap plane, each second parallel slot having an apex defining respective transducing gap depths of one said stack of the multistack transducer assembly.

9. The transducer assembly of claim 8 further comprising a transducer-to-recording medium surface having a planar contour and wherein all said second slots have the same depth to provide uniform transducing gap depths for all transducing channels with respect to said contour.

10. The transducer assembly of claim 8 further comprising a transducer-to-recording medium surface having a cylindrical contour and wherein said second slots of different stacks have different depths selected to provide uniform transducing gap depths for all transducing channels with respect to said contour.

11. The transducer assembly of claim 8 further comprising a transducer-to-recording medium surface having a spherical or eliptical contour and wherein the respective second slots have varying depths adjusted to provide uniform gap depths of all the channels with respect to said contour.

12. The transducer assembly of claim 1 wherein said first and second direction extend to each other at an angle equal to ten degrees or less.

13. The transducer assembly of claim 1 wherein said multichannel multistack transducer assembly has a transducer-to-medium surface arranged symetrically to obtain identical recording track format locations on an associated magnetic medium when said transducer assembly is rotated by 180 degrees with respect to a longitudinal direction of recording tracks.

14. The transducer assembly of claim 1 wherein each said transducing channel formed by one said partition has a pair of confronting magnetic pole pieces abutting at one said transducing gap plane to define a transducing gap therebetween, said magnetic pole pieces have chamfered magnetic transducer-to-recording medium surfaces and wherein respective chamfers of adjacent pole pieces formed by the same partition are alternatively oppositely oriented with respect to said parallel transducing gap planes.

15. The transducer assembly of claim 14 further comprising a nonmagnetic material filling a space between said chamfered surfaces of adjacent pole pieces and wherein said transducer assembly is contoured to obtain a transducer-to-recording medium surface having said pairs of magnetic pole pieces of adjacent multichannel stacks separated from each other by said nonmagnetic material.

16. The transducer assembly of claim 1 wherein one of said first and second direction forms a rectangular angle with said parallel transducing gap planes and the other one forms an acute angle with said parallel transducing gap planes.

17. A multichannel multistack magnetic transducer assembly having interlaced transducing channels of the respective stacks with respect to an associated recording medium relatively moving thereto, comprising:
a monolithic block having a least three blocks of magnetic material integrally joined together side-by-side at optically flat corresponding opposite parallel planar surfaces with a layer of nonmagnetic material therebetween, said joined surfaces forming respective parallel transducing gap planes, each gap plane pertaining to one stack of said multistack assembly, said medium relatively moving with respect to said gap planes in a first direction;
a common planar surface provided on said monolithic block extending in perpendicular to said parallel transducing gap planes;
a plurality of first elongated parallel slots provided in said monolithic block in perpendicular of said common planar surface and extending with their elongated dimensions across said transducing gap planes in a second direction, different from said first direction, said slots separating a plurality of parallel partitions, said partitions intersecting said transducing gap planes to form respective transducing channels, each channel having a pair of confronting magnetic pole pieces defining a transducing gap therebetween;
second parallel slots extending partially into said monolithic block each along one said transducing gap plane inwardly of said common planar surface and substantially in perpendicular thereto, each second slot defining respective transducing gap depths of one said stack of the multistack transducer assembly, said first and second parallel slots being filled with a nonmagnetic material; and
a magnetic back core assembly with transducing windings provided thereon, having a planar surface confronting said common planar surface of said monolithic block and joined therewith in mated secured engagement to complete a plurality of magnetic transducing circuits provided by said respective pairs of pole pieces of said multichannel multistack transducer assembly.

18. A method of making a multichannel multistack magnetic transducer assembly having interlaced transducing channels of the respective stacks with respect to an associated recording medium relatively moving thereto, comprising the steps of;

forming at least three corresponding blocks of magnetic material and providing corresponding optically flat opposite parallel planar surfaces on each block;

forming a monolithic block by intergrally joining together said magnetic blocks side-by-side with said opposite parallel planar surfaces abutting and with a layer of nonmagnetic transducing gap forming material therebetween to obtain at least two parallel transducing gap planes, each pertaining to one stack of the multichannel multistack assembly, said medium relatively moving with respect to said gap planes in a first direction;

providing a plurality of first elongated parallel slots extending partially into said monolithic block at a selected depth and extending with their elongated dimensions across said transducing gap planes in a second direction, different from said first direction, to obtain a plurality of parallel partitions separated by said first parallel slots, to form respective transducing channels, each channel having a pair of confronting magnetic pole pieces defining a transducing gap therebetween pertaining to a respective transducing channel of one said stack;

preparing a magnetic back core assembly having transducing windings provided thereon and joining said back core assembly to said monolithic block in mated secured engagement to complete a plurality of magnetic transducing circuits provided by said respective pairs of pole pieces of said multichannel multistack transducer assembly; and contouring said monolithic block at a transducer-to-recording medium surface to separate from each other said interlaced transducing channels formed by said partitions.

19. The method of claim 18 further comprising a step of filling said first slots with a nonmagnetic material prior to the step of joining said monolithic block with said back core assembly.

20. The method of claim 19 wherein said nonmagnetic material is selected to have a coefficient of thermal expansion similar to that of said magnetic material of said monolithic block, respectively.

21. The method of claim 18 wherein said common planar surface extends in perpendicular to said parallel transducing gap planes and wherein said first and second parallel slots extend perpendicularly to said common planar surface.

22. The method of claim 18 further comprising a step of forming a common planar surface on said monolithic block extending over all said joined magnetic blocks prior to the step of forming said first parallel slots and wherein said first parallel slots are provided inwardly of said common planar surface, prior to the step of joining said monolithic block with said back core assembly.

23. The method of claim 22 wherein the step of joining said monolithic block with said back core assembly further comprises forming a planar surface on said magnetic back core assembly corresponding to said common planar surface of said monolithic block and assembling said respective surfaces in a confronting relationship with each other.

24. The method of claim 22 further comprising a step of forming second parallel slots inwardly of said common planar surface and extending partially into said monolithic block along each said transducing gap plane at a depth smaller than the depth of said first slots, each second slot having an apex defining respective transducing gap depths of one said stack of the multistack transducer assembly, said step of forming said second parallel slots preceding said step of joining said monolithic block with said back core assembly.

25. The method of claim 24 further comprising a step of filling said first slots with a nonmagnetic material prior to the step of forming said second slots.

26. The method of claim 25 further comprising a step of filling said second slots with said nonmagnetic material prior to the step of joining said monolithic block with said back core assembly.

27. The method of claim 24 wherein the step of contouring said monolithic block comprises providing a planar contour and wherein all said second parallel slots have the same depth to obtain uniform transducing gap depths at all transducing channels with respect to said contour.

28. The method of claim 24 wherein the step of contouring said monolithic block comprises providing a cylindrical contour and wherein said second parallel slots of different stacks have different depths selected to obtain uniform transducing gap depths for all transducing channels with respect to said contour.

29. The method of claim 18 wherein the steps of contouring said monolithic block comprises providing a spherical or eliptical contour and wherein said second parallel slots are provided to have varying depths adjusted to obtain uniform gap depths of all the channels with respect to said contour.

30. The method of claim 18 wherein said partitions extend with respect to said direction of relative movement of the recording medium at an angle of ten degrees or less.

31. The method of claim 18 further comprising the steps of:

forming a nonmagnetic holder; and arranging said transducer assembly within said holder such that said interlaced transducing channels are symmetrically arranged with respect to an associated recording medium to obtain identical recording track format locations on said medium when said transducer assembly is rotated by 180 degrees with respect to a longitudinal direction of said recording tracks.

32. The method of claim 18 comprising the following steps prior to the contouring step:

forming alternatively sloping chamfered surfaces on adjacent pole pieces at said transducer-to-recording medium surface of said monolithic block;

filling said chamfered surfaces with a nonmagentic material to separate from each other said pairs of pole pieces of adjacent multichannel stacks; and contouring said monolithic block at said transducer-to-recording medium surface to obtain desired transducing gap depths and to expose a portion of said magnetic pole pieces at each said transducing gap plane.

33. The method of claim 18 comprising the following additional steps prior to the contouring step:

forming a number of corresponding blocks of nonmagnetic material and providing opposite parallel lateral planar surfaces thereon, each block having a width between said surfaces equal to one half of the distance between said parallel transducing gap planes of said monolithic block;

forming a first chamfered planar surface on each said nonmagnetic block at a selected angle with respect to said opposite planar surfaces;

assembling and integrally joining together said nonmagnetic blocks side-by-side with said lateral planar surfaces abutting and with said respective first chamfered surfaces of adjacent blocks oriented alternatively in opposite directions to obtain a nonmagnetic composite block;

forming second chamfered surfaces at a transducer-to-recording medium surface of said monolithic block, said second surfaces precisely corresponding to said first surfaces of said nonmagnetic block when held in abutting relationship therewith;

integrally joining said nonmagnetic composite block to said transducer-to-recording medium surface of said monolithic block at said first and second chamfered surfaces, respectively; and wherein said contouring step comprises contouring said integrally joined blocks at said transducer-to-recording medium surface to obtain desired transducing gap depths and to expose a portion of said magnetic pole pieces at each said transducing gap plane.

34. The method of claim 33 further comprising:

a step of filling said first slots with a nonmagnetic material prior to the step of joining said monolithic block with said back core assembly; and wherein the step of forming a plurality of second chamfered surfaces in said monolithic block comprises disposing an abrasive material between said first chamfered surfaces of said nonmagnetic composite block and said transducer-to-medium surface of said monolithic block; and moving reciprocally said respective surfaces in a direction parallel with the transducing gap planes until said second chamfered surfaces on said monolithic block are obtained.

35. The method of claim 18 wherein one of said first and second direction forms a rectangular angle with said parallel transducing gap planes and the other one forms an acute angle with said parallel transducing gap planes.

36. A method of making a multichannel multistack magnetic transducer assembly having interlaced transducing channels of the respective stacks with respect to an associated recording medium relatively moving thereto, comprising the steps of:

forming a number of corresponding blocks of magnetic material and providing corresponding optically flat opposite parallel planar surfaces on each block;

forming a monolithic block by integrally joining together said magnetic blocks side-by-side with said opposite parallel planar surfaces abutting and with a layer of nonmagnetic material therebetween to obtain a number of parallel transducing gap planes each pertaining to one stack of the multichannel multistack assembly, said medium relatively moving with respect to said gap planes in a first direction;

forming a common planar surface on said monolithic block extending over all said joined magnetic blocks and in perpendicular to said parallel gap planes;

forming a plurality of first elongated parallel slots inwardly of said common planar surface, said slots extending partially into said monolithic block and extending with their elongated dimensions across said transducing gap planes in a second direction, different from said first direction to obtain a plurality of parallel partitions, said partitions intersecting said transducing gap planes to form respective transducing channels, each channel having a pair of confronting magnetic pole pieces defining a transducing tap therebetween, said corresponding pairs of pole pieces being respectively aligned along said respective transducing gap planes;

filling said first slots with a first non-magnetic material;

forming second parallel slots each extending from said common planar surface partially into said monolithic block along one said transducing gap plane at a depth smaller than the depth of said first slots, each second slot having an apex defining respective tranducing gap depths of one said stack of the multistack transducer assembly;

preparing a magnetic back core assembly having transducing windings provided thereon and joining it with said monolithic block at said common planar surface in mated secured engagement to complete a plurality of magnetic transducing circuits provided by said respective pairs of pole pieces of said multichannel multistack transducer assembly; and contouring said joined monolithic block at a transducer-to-recording medium surface to separate from each other said interlaced transducing channels of said multichannel assembly formed by said partitions.

37. The method of claim 36 further comprising a step of filling said second slots with a second nonmagnetic material prior to the step of joining said monolithic block to said back core assembly, said second nonmagnetic material having a lower melting temperature than said first material.

38. A method of making a multichannel multistack magnetic transducer assembly having interlaced transducing channels of the respective stacks with respect to an associated recording medium relatively moving thereto, comprising the steps of:

forming at least three corresponding blocks of magnetic material and providing corresponding optically flat opposite parallel planar surfaces on each block;

forming a monolithic block by intergrally joining together said magnetic blocks side-by-side with said opposite parallel planar surfaces abutting and with a layer of nonmagnetic transducing gap forming material therebetween to obtain at least two parallel transducing gap planes, each pertaining to one stack of the multichannel multistack assembly, said medium relatively moving with respect to said planes in a first direction;

forming a common planar surface on said monolithic block extending over all said joined magnetic blocks in perpendicular to said parallel gap planes;

forming a plurality of first elongated parallel slots inwardly of said common planar surface, said slots extending partially into said monolithic block at a selected depth and extending with their elongated dimensions across said transducing gap planes in a second direction, different from said first direction, to obtain a plurality of parallel partitions separated by said first parallel slots, said partitions intersecting said transducing channels, each channel having a pair of confronting magnetic pole pieces defining a transducing gap therebetween pertaining to a respective transducing channel of one said stack, said corresponding pairs of pole pieces being respectively aligned along said respective transducing gap planes;

filling said first slots with a nonmagnetic material;

preparing a magnetic back core assembly having transducing windings provided thereon and joining said monolithic block at said common planar surface thereof in mated secured engagement with said back core assembly to complete a plurality of magnetic transducing circuits provided by said respective pairs of pole pieces of said multichannel multistack transducer assembly; and contouring said joined monolithic block at a transducer-to-recording medium surface to separate from each other said interlaced transducing channels formed by said partitions.

39. A multichannel multistack magnetic transducer assembly having interlaced transducing channels of the respective stacks with respect to relatively moving associated recording medium, comprising:

a monolithic block having at least three blocks of magnetic material integrally joined together side-by-side at optically flat corresponding opposite parallel planar surfaces with a layer of nonmagnetic transducing gap forming material therebetween, said joined surfaces forming respective parallel transducing gap planes, each gap plane pertaining to one stack of the multichannel multistack assembly, said medium relatively moving with respect to said gap planes in a first direction;

a common planar surface provided on said monolithic block extending in perpendicular to said parallel transducing gap planes;

a plurality of first elongated parallel slots provided in said monolithic block in perpendicular of said common planar surface and extending with their elongated dimensions across said tranducing gap planes in a second direction, different from said first direction, said first slots separating a plurality of parallel partitions, said partitions intersecting said transducing gap planes to form respective transducing channels, each channel having a pair of confronting magnetic pole pieces, defining a transducing gap therebetween, said first parallel slots being filled with a nonmagnetic material; and a magnetic back core assembly with transducing windings provided thereon, having a planar surface confronting said common planar surface of said monolithic block and joined therewith in mated secured engagement to complete a plurality of magnetic transducing circuits provided by said respective pairs of pole pieces of said multichannel multistack transducer assembly.

40. A multichannel multistack magnetic transducer assembly having interlaced transducing channels of the respective stacks with respect to an associated recording medium relatively moving thereto, comprising:

a monolithic block having at least three blocks of magnetic material integrally joined together at optically flat corresponding opposite parallel planar surfaces with a layer of nonmagnetic transducing gap forming material therebetween, said joined surfaces forming respective parallel transducing gap planes, each gap plane pertaining to one stack of the multichannel multistack assembly;

a plurality of parallel transducing channel forming partitions separated from each other by first elongated parallel slots and extending with their elongated dimensions across said transducing gap planes at an acute angle; and a magnetic back core assembly with transducing windings provided thereon joined with said monolithic block in mated secured engagement to complete a plurality of magnetic transducing circuits provided by said transducing channel forming partitions of said multichannel multistack transducer assembly.

41. A method of making a multichannel multistack magnetic transducer assembly having interlaced transducing channels of the respective stacks with respect to an associated recording medium relatively moving thereto, comprising the steps of:

forming at least three corresponding blocks of magnetic material and providing corresponding optically flat opposite parallel planar surfaces on each block;

forming a monolithic block by integrally joining together said magnetic blocks side-by-side with said opposite parallel planar surfaces abutting and with a layer of nonmagnetic transducing gap forming material therebetween to obtain at least two parallel transducing gap planes, each pertaining to one stack of the multichannel multistack assembly;

providing a plurality of first elongated parallel slots extending partially into said monolithic block at a selected depth and extending with their elongated dimensions across said transducing gap planes at an acute angle, to obtain a plurality of parallel partitions separated by said first parallel slots, to form respective transducing channels, each channel having a pair of confronting magnetic pole pieces defining a transducing gap therebetween pertaining to a respective transducing channel of one said stack;

preparing a magnetic back core assembly having transducing windings provided thereon and joining said back core assembly to said monolithic block in mated secured engagement to complete a plurality of magnetic transducing circuits provided by said respective pairs of pole pieces of said multichannel multistack transducer assembly; and contouring said monolithic block at a transducer-to-recording medium surface to separate from each other said interlaced transducing channels formed by said partitions.

* * * * *

UNITED STATES PATENT AND TRADEMARK OFFICE
CERTIFICATE OF CORRECTION

PATENT NO. : 4,607,305
DATED : August 19, 1986
INVENTOR(S) : Richard K. Milo

It is certified that error appears in the above-identified patent and that said Letters Patent is hereby corrected as shown below:

Column 2, line 61, "mnterial" should read --material--;

Column 8, line 31, "$\alpha$" should read -- $\varphi$ --.

Column 12, line 30, "a" (second occurrence) should read --at--.

Column 14, line 56, "nonmagentic" should read -- nonmagnetic --.

Signed and Sealed this

Fifth Day of January, 1988

Attest:

DONALD J. QUIGG

Attesting Officer

Commissioner of Patents and Trademarks